United States Patent [19]

Fasano

[11] 4,253,825
[45] Mar. 3, 1981

[54] GRAIN DRIER

[76] Inventor: Pietro Fasano, Strada San Martino 30/C, Cantalupa (To), Italy

[21] Appl. No.: 34,614

[22] Filed: Apr. 30, 1979

[30] Foreign Application Priority Data

Dec. 12, 1978 [IT] Italy ............................... 69831 A/78

[51] Int. Cl.³ .............................................. F27B 9/00
[52] U.S. Cl. ........................................ 432/149; 34/86;
34/203; 34/212; 34/215; 34/216; 34/217;
432/82; 432/150; 432/219
[58] Field of Search ................. 432/82, 146, 149, 150,
432/219; 34/86, 203, 212, 215, 216, 217, 219

[56] References Cited

U.S. PATENT DOCUMENTS

| 2,995,829 | 8/1961 | Allen | 34/217 |
| 3,419,338 | 12/1968 | Dirk et al. | 432/219 |
| 4,099,338 | 7/1978 | Mullin | 34/86 |
| 4,126,946 | 11/1978 | Buffington et al. | 34/216 |

FOREIGN PATENT DOCUMENTS 952735  3/1964  United Kingdom ....................... 34/216

Primary Examiner—John J. Camby

[57] ABSTRACT

A grain drier comprising a plurality of horizontal conveyor belts arranged one above another in staggered relationship so that grain delivered to one end of the upper conveyor belt will drop onto the lower conveyor belt when it gets to the other end of the upper conveyor belt and will then travel along the lower conveyor belt in opposite direction before being discharged. Hot air is supplied by a hot air generator through conduits to a position below and along each of the conveyor belts, passes upwardly through the conveyor belts which are formed of wire mesh and through the grain thereon and is extracted through discharge conduits from above the conveyor belts. The flow rate and temperature of the hot air may be varied. Heat from the extracted air may be recovered and recycled into the hot air generator. Also heat from the dried grain may be recovered and reconducted by means of a blower fan through a conduit onto the incoming fresh grain.

5 Claims, 3 Drawing Figures

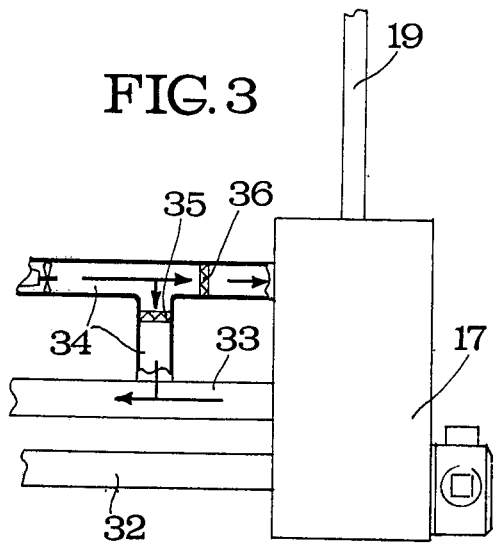
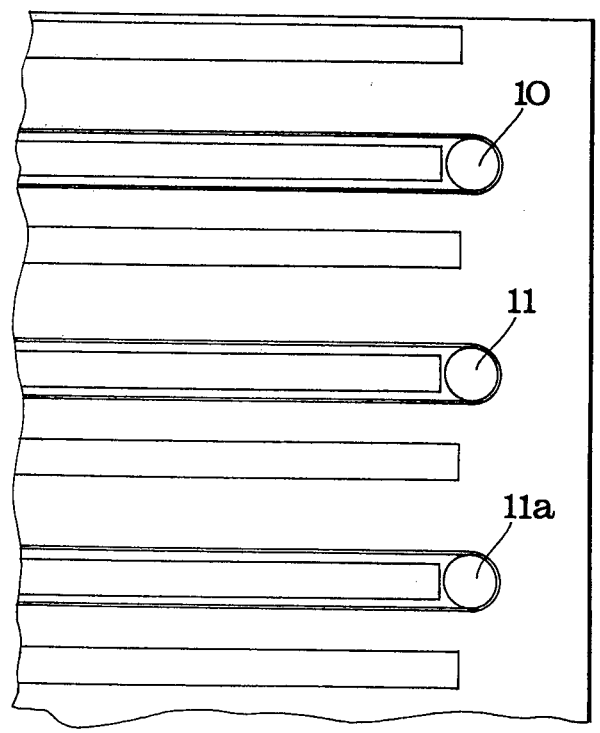

GRAIN DRIER

BACKGROUND OF THE INVENTION

This invention relates to a grain drier, particularly for cereals, operated by forced air of variable temperature to permit normal or fractional drying of the grain as well as recovery of the heat used for drying the grain. These are features different from those of conventional grain driers and afford some important advantages thereover as will be apparent from the following description.

First of all, a high thermal performance is obtained together with a rational drying process which ensures removal of odorous residues from the grain and avoids the risk of roasting.

It is further an object of the present invention to provide a grain drier which can also be used for drying other agricultural products such as fruit, vegetables, tobacco, coffee, tea, cocoa, silk cocoons as well as granular minerals of any type.

It is another object of the invention to provide a drier of the type described above, formed of means known per se, but arranged and used in such a manner as to ensure a simple and substantially automatic operation thereof so that only a few operators are required for supervising rather than manual work.

Finally, it is an object of the invention to provide a drier of the type described above, which can be made of modules adapted to be assembled into large-, medium- and small-sized plants and suitable to form a self-contained drying unit that may be installed in a fixed position or may be movable on wheels.

SUMMARY OF THE INVENTION

To achieve these and other objects and advantages which will become apparent in the course of the following description, the invention provides a forced air grain drier, particularly for cereals, which comprises means for varying the flow rate, quantity and temperature of the air and means for recovering the heat used for drying the grain. The heat may be recovered in two stages, first by recovering what hereinafter will be referred to as "primary heat", i.e. the heat obtained by heating ambient air, and secondly what hereinafter will be referred to as "secondary heat", i.e. heat recovered from the heated dried grain.

BRIEF DESCRIPTION OF THE DRAWINGS

FIG. 2 is a schematic part view illustrating a modification of the grain drier, and FIG. 3 is a schematic part view illustrating another modification.

DESCRIPTION OF PREFERRED EMBODIMENTS

Figure 1:
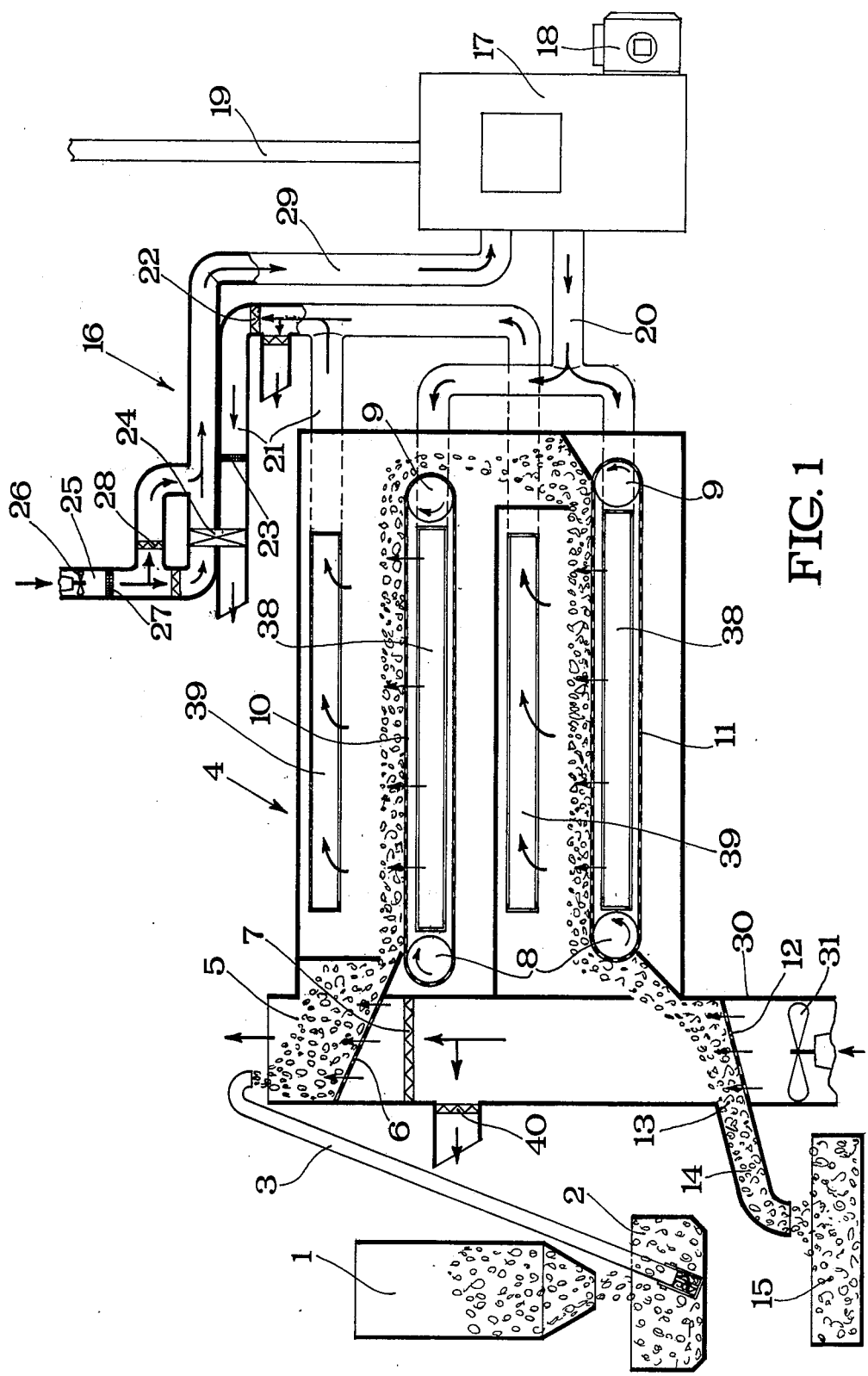
FIG. 1 is a schematic overall view of a grain drier according to the invention.

Referring to FIG. 1, the material to be dried, for example cereals, is contained in a storage container 1 and falls by gravity into a temporary storage vessel 2 from which a conveyor worm 3 feeds it into the drier generally indicated by 4 and comprising a hopper 5 accommodating a fixed grid 6 of perforated sheet metal overlying a partition 7.

Known means, not shown, for moving the material to be dried along the grid 6 are provided thereon and adjustable to various speeds according to the type of material to be dried. Further provided on the grid 6 are means for continuously shaking and mixing the material as well as regulating its thickness.

From the grid 6 the cereals are fed into the central portion of the drier where they are taken up by a pair of conveyor belts 10 and 11 formed of wire mesh passing around guide and drive rollers 8 and 9, with the conveyor belts 10 and 11 arranged one above the other. The conveyor belts 10 and 11 not only serve to move the cereals, but are also provided with means, not shown, for regulating their speed to ensure completely uniform drying of the cereals and avoid deterioration thereof by different degrees of drying not only in the moister layer thereof, but also by contact between the different portions which might lead to the formation of mold and contaminate the entire batch of cereals. The cereals thus dried fall by gravity onto a grid 12 from which they are discharged through an opening 13 over a conduit 14 into a collecting vessel 15.

The hot air producing and conducting assembly is generally indicated by 16 and comprises a conventional hot air generator 17 having a burner 18 and a flue gas discharge chimney 19. The hot air generator 17 may be of the type in which heat exchange takes place directly between the furnace and ambient air or of the hot water or superheated or vapor boiler with fluid-air exchanger type.

The air heated by the hot air generator 17 is fed through a bifurcated pipe 20 below the conveyor belts 10 and 11 and after having passed therethrough and the cereals thereon is discharged with a certain degree of moisture through a pipe 21 provided with a partition 22 and filter 23. A conventional hot air discharge device 38 and moist air extraction device 39 is associated with each of the conveyor belts 10 and 11. A plurality of heat exchangers 24 is provided between the moist air discharge pipe 21 and a fresh ambient air inlet pipe 25 leading to the hot air generator 17 and equipped with a fan 26, filter 27 and partition 28. Thus the heat of the moist air exhausted from pipe 21 is transferred through the heat exchangers 24 to the fresh air entering through pipe 25 to preheat this air before it is fed to the generator 17. In this manner about 60% of primary heat may be recovered. A by-pass conduit, not shown, may be used to exclude this recovery of heat if and when desired.

Further secondary heat may be recovered from the heated grain and used to preheat the grain to be dried. For this purpose the grain discharge grid 12 is arranged in a conduit 30 provided in its interior below the grid 12 with a blower fan 31. The dried grain retains the heat absorbed during the drying process for some time afterwards and is cooled by the flow of ambient air produced in the conduit 30 by the fan 31, before being discharged into the collecting vessel 15. This ambient air passes through the still hot grain and is heated without getting moist. By conducting it through the partition 7 and the grid 6 and the grain thereon in the hopper 5 it can be used for preheating the grain to be dried. This recovery of heat may likewise be excluded by using a conventional by-pass conduit. In the illustrated embodiment in this case the air is discharged through a partition 40 at the end of its flow cycle.

As mentioned previously, the air flow rate may be varied by means of a by-pass, not shown, arranged between the ambient air inlet and the air recycling inlet while maintaining the rpm of the air recycling fan motor constant, or by reducing the rpm by means of pulleys or a rheostat without by-pass. Also the temperature of the hot air may be varied by using an adjustable burner 18 while keeping the air flow rate constant, or by varying the air flow rate and keeping the amount of burnt fuel constant.

By using a plurality of burner modules the air temperature and flow rate may be kept constant. This may turn out to be of great advantage as the drying process is carried out at ambient air temperatures which will vary according to the season and time of the day. Another advantage of the invention consists in that it permits fractional drying by individually varying the speed of the conveyor belts 10 and 11. Further, each conveyor belt may be loaded to a different thickness and also the air flow rate may be individually varied for each conveyor belt.

The described grain drier will be completed by conventional dosing means as well as electric, electronic or pneumatic apparatus such as thermostats, moisture meters, anemometers, timers and the like to ensure completely automatic operation of the drier.

FIG. 2 shows a drier of greater capacity due to the use of more conveyor belts indicated by 10, 11 and 11a and still arranged below one another. The conveyor belt 11a may be followed by still further conveyor belts.

FIG. 3 shows a fractional temperature control system including conduits 32 and 33 connected to the hot air generator 17. By the conduit 32 the hot air is fed from the generator 17 directly below the conveyor belt 11. On the other hand, by using the conduit 33 the hot air coming from the generator 17 is mixed with ambient air supplied by a pipe connection 34 and fed below the conveyor belt 10. The pipe connection 34 is provided with a by-pass 35 and partition 36 to enable it to be closed when desired.

The operation of the described grain drier will be evident from the foregoing description of its component parts and it will also be evident that the described grain drier is particularly efficient due to the rational arrangement and automatic operation of its components.

A further advantage of the described grain drier consists in the arrangement and positioning of the hot air conducting system which in combination with the primary and secondary heat recovery system permits the inner portions of the drier to be appropriately selected for different treatment of the grain during the various drying stages.

Although some preferred embodiments of the invention have been described in detail and illustrated in the accompanying drawings, it is to be understood that the invention is not limited to these precise embodiments and that numerous changes and modifications obvious to one skilled in the art may be made therein, particularly with respect to the positions of the various parts forming the drier, without thereby departing from the scope of the invention as defined by the appended claims.

I claim:

1. A grain drier comprising
a housing;
a plurality of conveyor belts arranged horizontally in said housing one above another in sufficiently staggered endwise relationship so that grain conveyed to the end of the uppermost conveyor belt will drop onto the next lower conveyor belt and will descend in similar manner to the lowermost conveyor belt; means for delivering grain from a storage container to an inlet end of said uppermost conveyor belt;
means for generating hot air;
means for conducting said hot air from said generating means to a position below each of said conveyor belts and for distributin such hot air along and across said conveyor belts and upwardly through the grain thereon;
means for collecting, extracting and discharging the still hot but now moist air from a position above and along the upper surface of each of said conveyor belts;
means for recovering from said hot moist air heat used for drying the grain, including a conduit connected to said most air collecting, extracting and discharging means, a fresh air inlet conduit leading to said hot air generating means and a heat exchanger arranged across these two conduits for pre-heating air introduced into said fresh air inlet conduit;
means for collecting the dried grain discharged from the outlet end of the lowermost conveyor belt;
a third conduit arranged vertic ally at said outlet end of the lowermost of said conveyor belts, a grid arranged in an inclined position in said third conduit to allow the dried grain discharged from said lowermost conveyor belt to flow thereover by gravity; and a blower fan arranged below said grid to blow air through the hot grain on said grid upwardly within said vertical conduit onto the grain entering said inlet end of the uppermost of said conveyor belts.

2. A grain drier as claimed in claim 1, wherein said fresh air inlet conduit is connected to said hot air generating means.

3. A grain drier as claimed in claim 1, including a plurality of conduits connected to said hot air generating means and leading each to a location below one of said conveyor belts, at least one of said conduits being connected to a pipe adapted to selectively convey ambient air whereby the hot air supplied by said hot air generating means to each of said conveyor belts is fractionally adjustable and such fractional adjustment may be obtained by mixing it with fresh ambient air conveyed by said pipe.

4. A grain drier as claimed in claim 1, wherein said hot air generating means comprises a burner having means associated therewith for varying the temperature of the generated hot air.

5. A grain drier as claimed in claim 1, wherein said hot air generating means comprises a plurality of burner modules for maintaining the temperature and flow rate of the generated hot air constant.

* * * * *